(12) United States Patent
Benveniste

(10) Patent No.: US 8,223,790 B1
(45) Date of Patent: Jul. 17, 2012

(54) METHOD AND APPARATUS PERFORMING NO BACK-OFF FORWARDING

(75) Inventor: Mathilde Benveniste, South Orange, NJ (US)

(73) Assignee: Avaya Inc., Basking Ridge, NJ (US)

( * ) Notice: Subject to any disclaimer, the term of this patent is extended or adjusted under 35 U.S.C. 154(b) by 427 days.

(21) Appl. No.: 12/112,530

(22) Filed: Apr. 30, 2008

Related U.S. Application Data

(60) Provisional application No. 60/914,868, filed on Apr. 30, 2007, provisional application No. 60/917,283, filed on May 10, 2007, provisional application No. 60/938,340, filed on May 16, 2007.

(51) Int. Cl.
*H04L 12/413* (2006.01)
(52) U.S. Cl. ........................................ 370/448
(58) Field of Classification Search .................. None
See application file for complete search history.

(56) References Cited

U.S. PATENT DOCUMENTS

| | | | |
|---|---|---|---|
| 2002/0085582 A1* | 7/2002 | Kim | 370/445 |
| 2003/0189948 A1* | 10/2003 | Sashihara | 370/445 |
| 2004/0071154 A1* | 4/2004 | Wentink | 370/448 |
| 2004/0264429 A1* | 12/2004 | Tatara | 370/338 |
| 2005/0089045 A1* | 4/2005 | Shim et al. | 370/395.42 |
| 2006/0092871 A1* | 5/2006 | Nishibayashi et al. | 370/328 |
| 2007/0025379 A1* | 2/2007 | May et al. | 370/428 |
| 2007/0230389 A1* | 10/2007 | Amann et al. | 370/314 |
| 2008/0002734 A1* | 1/2008 | Zheng et al. | 370/445 |
| 2008/0107128 A1* | 5/2008 | Lo et al. | 370/448 |
| 2009/0257370 A1* | 10/2009 | Chen | 370/311 |

\* cited by examiner

*Primary Examiner* — Gregory Sefcheck
*Assistant Examiner* — Amar Persaud
(74) *Attorney, Agent, or Firm* — Chapin IP Law, LLC

(57) ABSTRACT

A method, apparatus and computer program product for performing no back-off forwarding are presented. A timer (NAV) is maintained at each respective node of a Wireless Local Area Network (WLAN). A frame is designated as a time-sensitive Quality of Service (TSQ) frame to be fast-forwarded from a first node to a second node of a plurality of nodes of the WLAN. The TSQ frame is forwarded by the second node according to a predetermined protocol, wherein a shorter back-off period is used for the TSQ frame than the back-off period normally used according to the predetermined protocol when the NAV of the second node expires.

18 Claims, 2 Drawing Sheets

METHOD AND APPARATUS PERFORMING NO BACK-OFF FORWARDING

CROSS REFERENCE TO RELATED APPLICATIONS

The present application claims the benefit of U.S. Provisional Patent Application No. 60/914,868, filed on Apr. 30, 2007; U.S. Provisional Patent Application No. 60/917,283, filed on May 10, 2007; and U.S. Provisional Patent Application No. 60/938,340, filed on May 16, 2007; all of which are incorporated herein by reference in their entirety.

BACKGROUND

Wireless Local Area Networks (WLANS) have become ubiquitous. Growth in demand for Wireless Local Area Networks (WLANs) is driving the development of new technology to provide higher throughput. To a greater extent this growth is due to the increased number of users and applications desiring wireless transmission and to a lesser extent to the emergence of new applications needing higher transmission rates along a single connection between two points.

In wireless Local Area Networks (LANs), a wireless channel can be reserved for the transmission of a single frame or of a sequence of frames, known as a TXOP (transmit opportunity), while employing asynchronous distributed random channel access methods, as described in the 2007 802.11 standard, which includes the 11e amendment, where the TXOP was introduced, the IEEE Std 802.11™-2007, (Revision of IEEE Std 802.11-1999), and the Wireless LAN Medium Access Control (MAC) and Physical Layer (PHY) Specifications.

In such an environment, both the source and destination of the transmission broadcast the reservation duration in order to establish the interference neighborhood. A TXOP is a sequence of frames transmitted between a pair of nodes following a single contention for the channel. A TXOP holder, the node initiating the TXOP, may transmit contention-free after the first transmission to the Responder, which is the node receiving the frames in the TXOP.

To date, there are two basic ways of reserving the channel for a TXOP in wireless LANs. One method of performing reservation is by utilizing Frame-by-frame reservation. According to the 802.11 distributed channel access MAC protocol, RTS/CTS frames are used to notify neighbors of the start of the reservation. Alternatively, the first frame of a TXOP has its duration field set to a time interval long enough to reserve the channel for the transmission of the following frame. The reservation time is extended on a frame-by-frame basis, by updating the length of the reservation with each data frame and the acknowledgement that follows. A consequence of frame-by-frame reservation is that, if the reservation is denied, it does not require cancellation.

Another method of performing reservation in wireless LANS is by utilizing Start-to-finish reservation. If it is not be possible to extend the time of channel reservation on a frame-by-frame basis, the channel must be reserved for the entire sequence of transmissions, start to finish, at the time of the reservation request, and, if the reservation request is denied, or if time remains reserved at the completion of transmission, the reservation must be cancelled.

A start-to-finish reservation applies to any combination of nodes (i.e. mesh points/APs/stations). A node reserves a channel to cover an entire sequence of transmissions, directed to either one or various different destinations, possibly including responses from the destinations. If the reservation is not authorized, or when the transmission sequence is completed, the reserving node releases the remaining reservation time by canceling the reservation.

To avoid collisions, each node keeps a NAV for a traffic channel, which is set according to the received reservation requests and responses. A NAV is defined as a time period a node must refrain from transmitting on a traffic channel. It is maintained by each station and is updated by the Duration field value of received transmissions, which may serve as TXOP reservation requests or responses to reservation requests. A reservation request from the transmissions source is either granted or denied by the destination, and notice is sent to the source. The response contains in the Duration field the remaining reservation duration in order to notify the neighbors of the destination node. Applications for wireless networks include Voice Over Internet Protocol (VoIP), and multimedia (Voice and/or Video), together referred to as VoIP/multimedia. VoIP/multimedia applications require a certain Quality of Service (QoS) in order to maintain sufficient quality of the communication. Latency can be an issue for VoIP/multi-media. Meeting QoS requires short total end-to-end over-the-air delays. The 802.11e amendment to the IEEE 802.11 standard, which is incorporated in the 2007 revision of the standard, provides mechanisms for reducing the over-the-air delays from transmissions in a wireless LAN. These are single hop transmissions. The 802.11e mechanisms may not be adequate for meeting latency requirements in wireless networks involving multiple-hop transmissions. Wireless mesh networks are such networks. A wireless mesh may be an Ad hoc mode mesh (not attached to a wired network) or an infrastructure mode mesh (attached to a wired network). In general, both traffic with source and destination in the mesh and traffic bound from/to a wired network may co-exist on a mesh. The latency/jitter limit for voice traffic traversing the wired network is lower (40 to 50 milliseconds) than that for traffic staying on the wireless mesh (175-200 milliseconds).

A mesh will involve multiple-hop flows. The mesh backbone network is a multi-hop network. The multi-hop path delay will be at least a multiple of the single hop delay. Wireless meshes operating on a single channel have novel collision behavior that can impact nearby the latency experienced end to end, over the air. The prevalence of hidden nodes and the interaction of contention-based access with multi-hop flows impose latency increases on both mesh and nearby WLANs beyond what non-mesh experience suggests. Hidden nodes remain hidden after retrial, and their transmissions are dropped. The high correlation of sequentially forwarded frames on a multi-hop flow cause excessive delays to transmissions that have been involved in a collision. For backward compatibility, and for the contention-based access protocol to continue to be used, remedies are needed on the mesh side. For QoS traffic, multi-hop delay must meet the same latency constraints as single-hop delay. We describe remedies to reduce over-the-air latency. The goal is to reduce the delay experienced on the longest multi-hop path by forwarding frames along a multi-hop path fast.

SUMMARY

One way to reduce delay in a wireless mesh is by providing capacity provisioning. The nodes and links of the mesh network must have sufficient capacity to prevent traffic buffer from building up anywhere in the network. Proper provisioning involves the use of multiple radios at nodes of high traffic concentration to match traffic profiles.

Another way to reduce delay in wireless mesh is by providing congestion control. Reducing transmit rate and rerouting traffic can alleviate congestion, given the provisioning. Even with proper provisioning, the stochastic nature of traffic may produce short-term fluctuations that may cause congestion at certain nodes.

MAC layer prioritized transmission of forwarded QoS traffic across the mesh helps reduce end-to-end delay along a multi-hop path, given congestion control and capacity provisioning. For fast forwarding, QoS traffic would require top priority access when forwarded on a multi-hop path. Lower priority access would be used for all other traffic. EDCA offers access prioritization on a single channel. Further prioritization is not possible with EDCA, however. Higher-priority 802.11e traffic (VO/VI) already uses the top-priority access category. A different mechanism is needed for forwarded QoS traffic.

MAC layer prioritized transmission of forwarded QoS traffic across the mesh helps reduce end-to-end delay along a multi-hop path, given congestion control and capacity provisioning. For fast forwarding, QoS traffic would require top priority access when forwarded on a multi-hop path. Lower priority access would be used for all other traffic. EDCA offers access prioritization on a single channel. Further prioritization is not possible with EDCA, however. Top-priority 11e traffic (VO/VI) already uses the top-priority access category. A different mechanism is needed for forwarded QoS traffic Conventional mechanisms such as those explained above suffer from a variety of deficiencies. Embodiments of the invention significantly overcome such deficiencies and provide mechanisms and techniques that provide for no back-off forwarding of frames designated as time-sensitive frames.

In a particular embodiment of a method for providing no back-off forwarding, the method includes maintaining at each respective node of a plurality of nodes of a Wireless Local Area Network (WLAN), a timer (NAV) set to a corresponding time period during which the respective node must refrain from transmitting on a channel. The method also includes designating a frame as a time-sensitive Quality of Service (TSQ) frame to be fast-forwarded from a first node to a second node of a plurality of nodes of the WLAN. Additionally, the method includes forwarding the TSQ frame by the second node according to a predetermined protocol, wherein a shorter back-off period is used for the TSQ frame than the back-off period normally used according to the predetermined protocol when the NAV of the second node expires.

Other embodiments include a computer readable medium having computer readable code thereon for providing no back-off forwarding. The computer readable medium includes maintaining at each respective node of a plurality of nodes of a Wireless Local Area Network (WLAN), a timer (NAV) set to a corresponding time period during which the respective node must refrain from transmitting on a channel. The computer readable medium also includes instructions for designating a frame as a time-sensitive Quality of Service (TSQ) frame to be fast-forwarded from a first node to a second node of a plurality of nodes of a Wireless Local Area Network (WLAN). Additionally, the computer readable medium includes instructions for forwarding the TSQ frame by the second node according to a predetermined protocol, wherein a shorter back-off period is used for the TSQ frame than the back-off period normally used according to the predetermined protocol when the NAV of the second node expires.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides express forwarding as explained herein that when performed (e.g. when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing express forwarding as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Avaya, Inc. of Lincroft, N.J.

Note that each of the different features, techniques, configurations, etc. discussed in this disclosure can be executed independently or in combination. Accordingly, the present invention can be embodied and viewed in many different ways.

Also, note that this summary section herein does not specify every embodiment and/or incrementally novel aspect of the present disclosure or claimed invention. Instead, this summary only provides a preliminary discussion of different embodiments and corresponding points of novelty over conventional techniques. For additional details, elements, and/or possible perspectives (permutations) of the invention, the reader is directed to the Detailed Description section and corresponding figures of the present disclosure as further discussed below.

BRIEF DESCRIPTION OF THE DRAWINGS

The foregoing will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
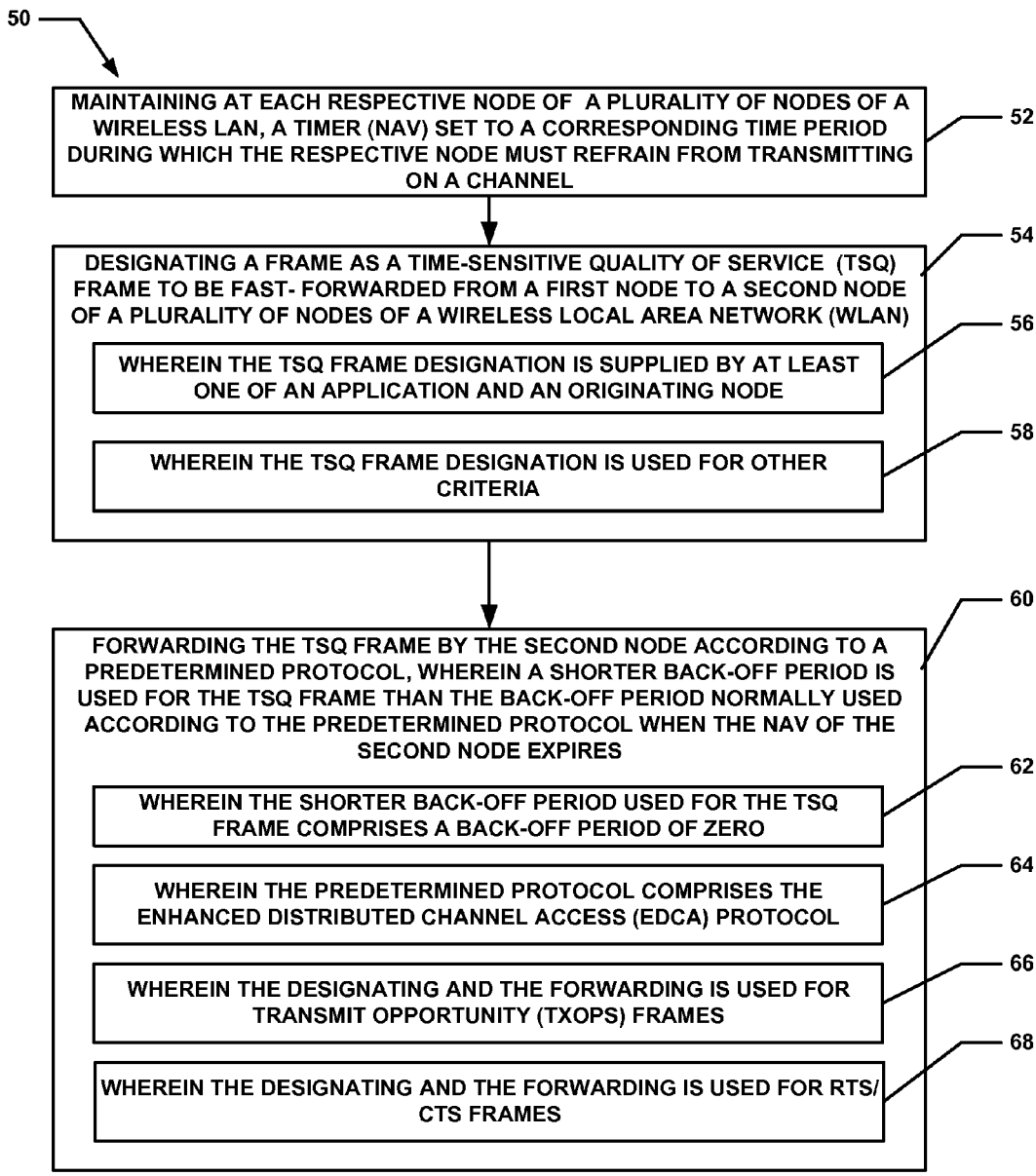
FIG. 1 depicts a flow diagram of a particular embodiment of a method of performing no-back-off forwarding of time-critical frames.

Express forwarding is a technique used to reduce delay for a designated frame along a multi-hop path by insuring that a forwarding node incurs less delay than single-hop transmissions. For a single-channel mesh forwarding delay is reduced by reserving the channel for a forwarded transmission for a sufficiently long time interval to enable the next forwarding node to seize the channel. Immediate access is thus given to nodes, other than the first node on a multi-hop path, forwarding QoS traffic.

A frame to be express forwarded is designated as a time-sensitive QoS (TSQ) transmission. A special flag may be used to mark a transmission as express forwarded, depending on the criteria for a TSQ transmission and/or the information available along its path. The TSQ designation may be supplied by the application, for example, a TSQ frame could be a frame of a specified user priority (e.g. VO). Alternatively, the TSQ designation may also be supplied by the originating node, for example, if there is differentiation between ad hoc and infrastructure traffic, all voice frames starting or destined to the portal would be designated TSQ by the originating node. The TSQ designation can further be used for other criteria.

In order to process an express forwarded frame, a known time increment DT0 is added to the value of the Duration field when a TSQ frame is forwarded. The Duration field of the ACK (if any) returned for the TSQ frame received at the destination node is set based on the Duration field of the received frame. All nodes that hear the transmission other than the receiving node set their NAV according to the Duration field of the received transmission. If the receiving node forwards the frame, it subtracts DT0 from the Duration value of a received frame before setting its NAV, and attempts transmission of the received TSQ frame when acknowledgement of receipt of the TSQ frame is complete. DT0 should be sufficiently long to enable a forwarding node to process the received frame and prepare it for transmission on the next hop. It must be at least a time slot long.

An alternative (and more efficient) implementation will not add DT0 to the Duration value of the frame transmitted on the last hop (i.e. to the final destination MP).

An alternative approach to Express Forwarding is known as no back-off forwarding. A frame to be allowed fast forwarding is designated as a time-sensitive QoS (TSQ) transmission, as in the case of Express Forwarding. A special flag may be necessary to mark a transmission as no back-off forwarded, depending on the criteria for a TSQ transmission and/or the information available along its path. If the node receiving a TSQ frame must forward it, it may attempt to do so following the transmission protocol rules, but with a shorter backoff than indicated by the transmission protocol parameters. A back-off of zero may be used.

One such protocol is Enhanced Distributed Channel Access (EDCA). EDCA offers priority access to single hop transmissions to achieve a shorter over-the-air delay relative to other traffic. EDCA does not ensure short end-to-end delays for multiple hop traffic. No back-off forwarding also works for TXOPs and RTS/CTS. No back-off forwarding is compatible with stations/APs observing any of the existing 802.11 MAC protocols. The no back-off forwarding feature is optional.

A comparison of Express Forwarding and no back-off forwarding shows that express forwarding can reduce channel access delay along a multi-hop path more than the No back-off forwarding approach. With express forwarding, there is no chance that another node will transmit before the forwarding node as the channel is idle; hence there are no collisions and the forwarding node gets priority access. No back-off forwarding may result in collisions with other nodes whose backoff is expired. No back-off forwarding leads to better utilization of the channel if the time needed for frame preparation is substantial. Under Express forwarding, the channel will sit idle for the frame preparation time, which is equal to DT0-DTI. Other frames, including time-critical frames may be transmitted while the forwarding node is preparing to transmit the received frame for the next hop. Which fast forwarding method is preferable depends on the time needed to prepare a frame for forwarding.

A flow chart of the presently disclosed method is depicted in FIG. 1. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIG. 1, a particular embodiment of a method 50 of performing express forwarding is shown. Method 50 begins with processing block 52 which discloses maintaining at each respective node of a plurality of nodes of a Wireless Local Area Network (WLAN), a timer (NAV) set to a corresponding time period during which the respective node must refrain from transmitting on a channel.

Processing block 54 states designating a frame as a TSQ frame to be fast-forwarded from a first node to a second node of the plurality of nodes. As shown in processing block 56 the TSQ frame designation is supplied by at least one of an application and an originating node. As further shown in processing block 58 the TSQ frame designation is used for other criteria.

Processing continues with processing block 60 which discloses forwarding the TSQ frame by the second node according to a predetermined protocol, wherein a shorter back-off period is used for the TSQ frame than the back-off period normally used according to the predetermined protocol when the NAV of the second node expires.

Processing block 62 discloses wherein the shorter back-off period used for the TSQ frame comprises a back-off period of zero.

Processing block 64 wherein the predetermined protocol comprises the Enhanced Distributed Channel Access (EDCA) protocol.

Processing block 66 discloses wherein the designating and the forwarding are used for Transmit Opportunity (TXOPS) frames. Processing block 68 states wherein the designating and the forwarding is used for RTS/CTS frames.

Figure 2:
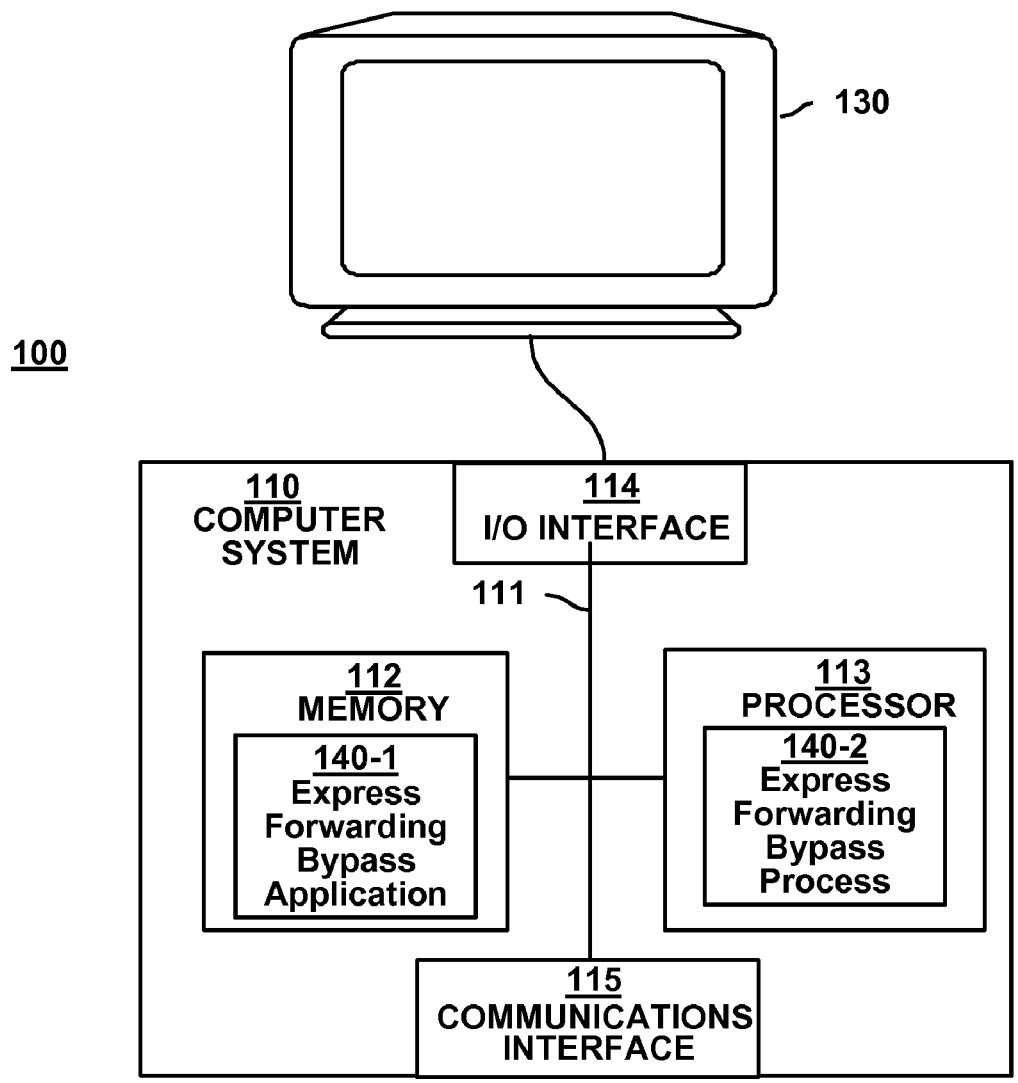
FIG. 2 illustrates an example computer system architecture for a computer system that performs no-back-off forwarding of time-critical frames in accordance with embodiments of the invention.

FIG. 2 is a block diagram illustrating an example computer system 100 (a node) for implementing no back-off forwarding function 140 and/or other related processes to carry out the different functionality as described herein.

As shown, computer system 100 of the present example includes an interconnect 111 that couples a memory system 112 and a processor 113 an input/output interface 114, and a communications interface 115.

As shown, memory system 112 is encoded with no back-off forwarding application 140-1. No back-off forwarding application 140-1 can be embodied as software code such as data and/or logic instructions (e.g., code stored in the memory or on another computer readable medium such as a disk) that support functionality according to different embodiments described herein.

During operation, processor 113 of computer system 100 accesses memory system 112 via the interconnect 111 in order to launch, run, execute, interpret or otherwise perform the logic instructions of the no back-off forwarding application 140-1. Execution of no back-off forwarding application 140-1 produces processing functionality in no back-off forwarding process 140-2. In other words, the no back-off forwarding process 140-2 represents one or more portions of the no back-off forwarding application 140-1 (or the entire application) performing within or upon the processor 113 in the computer system 100.

It should be noted that, in addition to the no back-off forwarding process 140-2, embodiments herein include the no back-off forwarding application 140-1 itself (i.e., the unexecuted or non-performing logic instructions and/or data). The no back-off forwarding application 140-1 can be stored on a computer readable medium such as a floppy disk, hard disk, or optical medium. The no back-off forwarding application 140-1 can also be stored in a memory type system such as in firmware, read only memory (ROM), or, as in this example, as executable code within the memory system 112 (e.g., within Random Access Memory or RAM).

In addition to these embodiments, it should also be noted that other embodiments herein include the execution of no back-off forwarding application 140-1 in processor 113 as the no back-off forwarding process 140-2. Those skilled in the art will understand that the computer system 100 can include other processes and/or software and hardware components, such as an operating system that controls allocation and use of hardware resources associated with the computer system 100.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet, as well as a virtual network. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD- ROM, or a computer diskette, having computer readable program code segments stored thereon. The computer readable medium can also include a communications link, either optical, wired, or wireless, having program code segments carried thereon as digital or analog signals. Accordingly, it is submitted that that the invention should not be limited to the described embodiments but rather should be limited only by the spirit and scope of the appended claims.

What is claimed is:

1. A method comprising:
maintaining at each respective node of a plurality of nodes of a Wireless Local Area Network (WLAN), a timer (NAV) set to a corresponding time period during which the respective node must refrain from transmitting on a channel; designating a frame as a time-sensitive Quality of Service (TSQ) frame to be fast-forwarded from a first node to a second node of a plurality of nodes of a Wireless Local Area Network (WLAN), wherein said TSQ frame designation is supplied by at least one of an application and an originating node, and wherein said TSQ frame designation is used for other criteria, wherein said other criteria include at least one of traffic load on a node and expiration time of a packet; and
forwarding said TSQ frame by said second node according to a predetermined protocol, wherein after a collision a shorter back-off period is used for said TSQ frame than the back-off period normally used according to said predetermined protocol when said NAV of said second node expires.

2. The method of claim 1 wherein said shorter back-off period used for said TSQ frame comprises a back-off period of zero.

3. The method of claim 1 wherein said predetermined protocol comprises the Enhanced Distributed Channel Access (EDCA) protocol.

4. The method of claim 1 wherein said designating and said forwarding is used for Transmit Opportunity (TXOPS) frames.

5. The method of claim 1 wherein said designating and said forwarding is used for RTS/CTS frames.

6. The method of claim 1 wherein said designating a frame as a time-sensitive Quality of Service frame comprises marking said frame transmission with a special flag to indicate said frame is a TSQ frame.

7. A non-transitory computer readable medium having computer readable code thereon for providing no back-off forwarding of frames, the medium comprising:
instructions for maintaining at each respective node of a plurality of nodes of a Wireless Local Area Network (WLAN), a timer (NAV) set to a corresponding time period during which the respective node must refrain from transmitting on a channel;
instructions for designating a frame as a time-sensitive Quality of Service (TSQ) frame to be fast-forwarded from a first node to a second node of a plurality of nodes of a Wireless Local Area Network (WLAN) wherein said TSQ frame designation is supplied by at least one of an application and an originating node, and wherein said TSQ frame designation is used for other criteria, wherein said other criteria include at least one of traffic load on a node and expiration time of a packet; and
instructions for forwarding said TSQ frame by said second node according to a predetermined protocol, wherein after a collision a shorter back-off period is used for said TSQ frame than the back-off period normally used according to said predetermined protocol when said NAV of said second node expires.

8. The computer readable medium of claim 7 further comprising instructions wherein said shorter back-off period used for said TSQ frame comprises a back-off period of zero.

9. The computer readable medium of claim 7 further comprising instructions wherein said predetermined protocol comprises the Enhanced Distributed Channel Access (EDCA) protocol.

10. The computer readable medium of claim 7 further comprising instructions wherein said designating and said forwarding is used for Transmit Opportunity (TXOPS) frames.

11. The computer readable medium of claim 7 further comprising instructions wherein said designating and said forwarding is used for RTS/CTS frames.

12. The computer readable medium of claim 7 wherein said instructions for designating a frame as a time-sensitive Quality of Service frame comprises instructions for marking said frame transmission with a special flag to indicate said frame is a TSQ frame.

13. A computer system comprising:
a memory;
a processor;
a communications interface;
an interconnection mechanism coupling the memory, the processor and the communications interface; and
wherein the memory is encoded with a no back-off forwarding application that when performed on the processor, provides a no back-off s forwarding bypass process for processing information, the no back-off forwarding process causing the computer system to be capable of performing the operations of:
maintaining at each respective node of a plurality of nodes of a Wireless Local Area Network (WLAN), a timer (NAV) set to a corresponding time period during which the respective node must refrain from transmitting on a channel;
designating a frame as a time-sensitive Quality of Service (TSQ) frame to be fast-forwarded from a first node to a second node of a plurality of nodes of a Wireless Local Area Network (WLAN) wherein said TSQ frame designation is supplied by at least one of an application and an originating node, and wherein said TSQ frame designation is used for other criteria, wherein said other criteria include at least one of traffic load on a node and expiration time of a packet; and
forwarding said TSQ frame by said second node according to a predetermined protocol, wherein after a collision a shorter back-off period is used for said TSQ frame than the back-off period normally used according to said predetermined protocol when said NAV of said second node expires.

14. The computer system of claim 13 wherein said shorter back-off period used for said TSQ frame comprises a back-off period of zero.

15. The computer system of claim 13 wherein said predetermined protocol comprises the Enhanced Distributed Channel Access (EDCA) protocol.

16. The computer system of claim 13 wherein said designating and said forwarding is used for Transmit Opportunity (TXOPS) frames.

17. The computer system of claim 13 wherein said designating and said forwarding is used for RTS/CTS frames.

18. The computer system of claim 13 wherein said designating a frame as a time-sensitive Quality of Service frame comprises marking said frame transmission with a special flag to indicate said frame is a TSQ frame.

* * * * *